May 18, 1937. L. TEACH 2,081,023
INDOOR GARDEN BOX AND AQUARIUM
Filed June 3, 1936
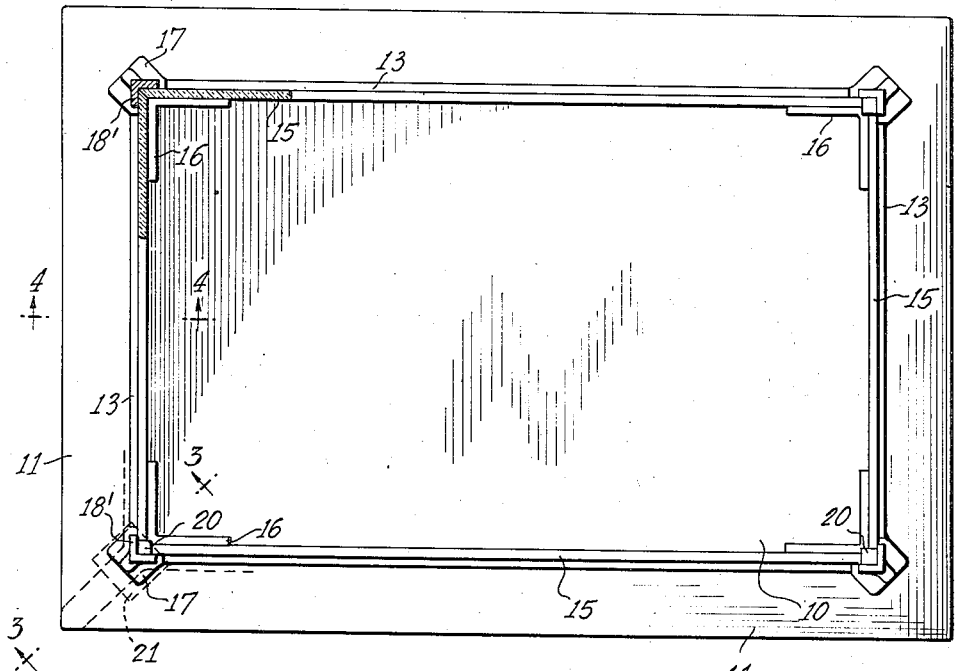
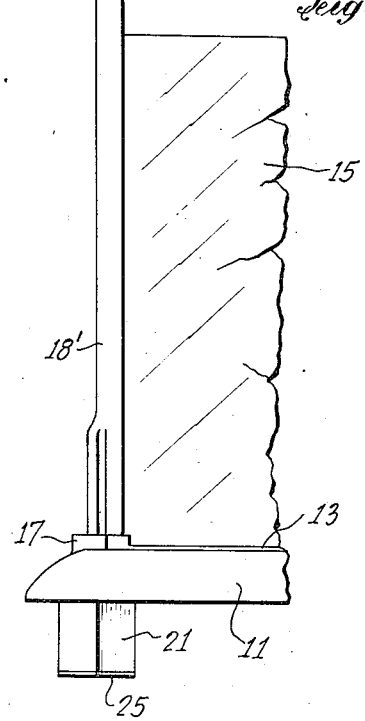
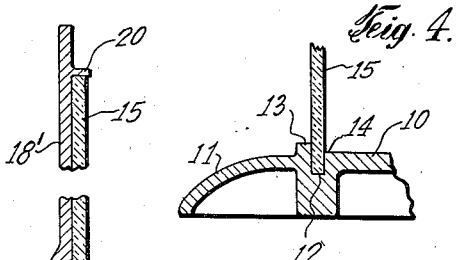
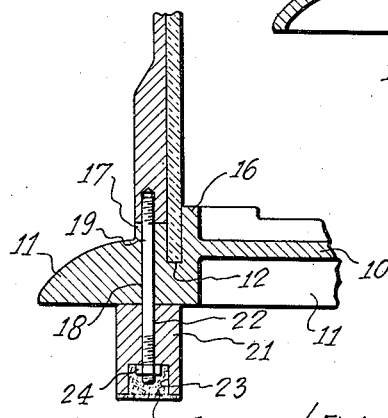
INVENTOR.
LEWIS TEACH.
BY F. Ledermann
ATTORNEY.

Patented May 18, 1937

2,081,023

UNITED STATES PATENT OFFICE 2,081,023

INDOOR GARDEN BOX AND AQUARIUM

Lewis Teach, Brooklyn, N. Y.

Application June 3, 1936, Serial No. 83,202

1 Claim. (Cl. 47—34)

One object of this invention is the provision of a novel box-like structure adapted for use as an indoor garden box or as an aquarium.

Another object of the invention is the provision of such a box on a base having removable sides of glass and provided with detachable corner supports mounted on the base and adapted to retain the glass sides in position at the corners.

The above and other objects will become apparent in the description below, in which characters of reference refer to like-named parts in the accompanying drawing.

Referring briefly to the drawing, Figure 1 is a plan view of the box.

Figure 2 is a front elevational view of one end of the box.

Figure 3 is a cross-sectional view taken on the line 3—3 of Figure 1.

Figure 4 is a cross-sectional view taken on the line 4—4 of Figure 1.

Referring in detail to the drawing, the numeral 10 comprises the bottom or floor panel of the box, this panel having a peripheral edge or base 11 rounded in cross-section as shown, which may, however, be beveled if desired. A groove 12 extends around the periphery of the panel 10 parallel with the sides of the box. The outer wall 13 of the groove 12 is raised higher than the inner wall 14, the latter being the outer edge of the floor panel 10.

Four side panels 15 of glass are mounted in the groove 12 and extend upright from the panel 10. In each corner inside the glass walls 15, angle-shaped ridges 16 rise integral from the panel 10, and act as props to reinforce the glass panels 15 at the inside corners. At each corner of the box near the inner edge of the base 11, a raised boss 17 is provided, whose upper surface is horizontal. A vertical bore 18 extends downward from the upper surface into each boss 17 and through the base 11 at the corners. Corner uprights or posts 18' having each a bolt 19 threaded at its lower end extending from the bottom thereof which are passed down through the bores 18, rest upon the bosses 17. A square lug 20 on each post is adapted to be urged down against the upper edges of the joined glass panels 15. The base 11 is hollow throughout its periphery excepting at the corners where it is solid, as shown in Figure 3.

At each corner, a removable leg 21 of catalin or other desirable material, is mounted. The leg 21 has a vertical bore 22 passing therethrough and is secured to the base 11 by means of the bolt 19 passing down through the bore 22. At the bottom the bore 22 is widened to provide a mouth 23 into which the threaded end of the bolt 19 projects. A nut 24 is screwed on to the bolt 19, and tightening of this nut draws the post 18 down to sit securely on the boss 17. At the same time the post lug 20 is forced down against the corners of the glass walls 15 to lock the wall panels together. The bolt end and the nut 24 are covered by means of a cap 25 of felt or similar material which is secured about the enlarged bottom mouth of the bore 22 and also covers the bottom of the leg 21.

The box as described may be used as an indoor garden box with or without a glass cover, not shown. The latter is used when very small or minute plants are raised in the box, and suitable ventilation may be provided in the cover. This cover serves to trap and retain moisture within the soil contained in the box, as well as to serve as a heat insulator to keep the growing plants warm.

The box may be used as an aquarium without a cover and, if desired, additional waterproofing provision, not shown, may be used.

Obviously, modifications in form and structure may be made without departing from the spirit and scope of the invention.

I claim:

A box of the class described, comprising a panel substantially rectangular in outline having a groove extending around the same parallel with the edge thereof, a base extending around said panel beyond said groove, glass walls removably mounted upright in said grooves, means for supporting said walls at the corners, said means comprising upright posts supported on said base, a lug near the top of each of said posts adapted to urge the upper corners of said walls downward, said base having raised bosses near its corners adjacent the corners of said walls, the upper surface of said bosses being horizontal, said upright members being mounted on said bosses, and means for drawing said posts down against said bosses and simultaneously drawing said lugs down against the upper corners of said walls to lock said walls securely in said groove.

LEWIS TEACH.